(12) United States Patent
Clein

(10) Patent No.: US 10,368,662 B2
(45) Date of Patent: Aug. 6, 2019

(54) SYSTEM AND METHOD OF MONITORING RETAIL UNITS

(71) Applicant: TRAX TECHNOLOGY SOLUTIONS PTE LTD., Singapore (SG)

(72) Inventor: Shavit Noa Clein, Singapore (SG)

(73) Assignee: TRAX TECHNOLOGY SOLUTIONS PTE LTD., Singapore (SG)

( * ) Notice: Subject to any disclaimer, the term of this patent is extended or adjusted under 35 U.S.C. 154(b) by 594 days.

(21) Appl. No.: 14/888,978

(22) PCT Filed: Apr. 24, 2014

(86) PCT No.: PCT/IL2014/050378
§ 371 (c)(1),
(2) Date: Nov. 4, 2015

(87) PCT Pub. No.: WO2014/181324
PCT Pub. Date: Nov. 13, 2014

(65) Prior Publication Data
US 2016/0143459 A1 May 26, 2016

(30) Foreign Application Priority Data
May 5, 2013 (IL) .......................................... 226146

(51) Int. Cl.
*B65D 1/00* (2006.01)
*A47F 10/02* (2006.01)
(Continued)

(52) U.S. Cl.
CPC ................ *A47F 10/02* (2013.01); *A47F 3/02* (2013.01); *A47F 3/08* (2013.01); *A47F 3/125* (2013.01);
(Continued)

(58) Field of Classification Search
CPC ... G06Q 10/087; G11B 33/08; B65D 2211/00
(Continued)

(56) References Cited

U.S. PATENT DOCUMENTS 6,195,122 B1  2/2001  Vincent
6,618,511 B1  9/2003  Mancuso et al.
(Continued)

FOREIGN PATENT DOCUMENTS

FR       2851833       9/2003
JP    2002295959 A    10/2002
(Continued)

OTHER PUBLICATIONS

Changchang Wu et al.; "3D Model Matching With Viewpoint-Invariant Patches (VIP)", Computer Vision and Pattern Recognition, CVPR 2008, IEEE Conference, pp. 1-8 (2008).
(Continued)

*Primary Examiner* — A. Hunter Wilder
(74) *Attorney, Agent, or Firm* — Finnegan, Henderson, Farabow, Garrett & Dunner LLP

(57) ABSTRACT

The present disclosure provides a retail unit comprising: a display module capable of accommodating one or more retail items; a door module configured to pivot away from the display module; and an imaging module coupled to the door module and configured to allow imaging of the display module.

13 Claims, 4 Drawing Sheets

(51) Int. Cl.

| | | |
|---|---|---|
| *A47F 3/02* | (2006.01) | |
| *A47F 3/08* | (2006.01) | |
| *A47F 3/12* | (2006.01) | |
| *G06Q 10/08* | (2012.01) | |
| *G11B 33/08* | (2006.01) | |

(52) U.S. Cl.
CPC ..... *A47F 2010/025* (2013.01); *B65D 2211/00* (2013.01); *G06Q 10/087* (2013.01); *G11B 33/08* (2013.01)

(58) Field of Classification Search
USPC .................................. 705/28; 720/639, 657
See application file for complete search history.

(56) References Cited

U.S. PATENT DOCUMENTS

| | | | |
|---|---|---|---|
| 7,031,948 B2 | 4/2006 | Lee | |
| 7,210,136 B2 | 4/2007 | Swett | |
| 7,287,731 B2 | 10/2007 | Johnson | |
| 7,620,909 B2 | 11/2009 | Park et al. | |
| 7,903,883 B2 | 3/2011 | Zitnick et al. | |
| 8,131,086 B2 | 3/2012 | Hua et al. | |
| 8,515,207 B2 | 8/2013 | Chau | |
| 8,559,766 B2 | 10/2013 | Tilt et al. | |
| 9,160,899 B1 | 10/2015 | Boyle et al. | |
| 2005/0256391 A1 | 11/2005 | Satoh et al. | |
| 2007/0025723 A1 | 2/2007 | Baudisch et al. | |
| 2007/0031062 A1 | 2/2007 | Pal et al. | |
| 2007/0070233 A1 | 3/2007 | Patterson | |
| 2007/0081081 A1 | 4/2007 | Cheng | |
| 2008/0074489 A1 | 3/2008 | Zhang et al. | |
| 2009/0003708 A1 | 1/2009 | Steinberg et al. | |
| 2009/0192921 A1 | 7/2009 | Hicks | |
| 2010/0035637 A1 | 2/2010 | Varanasi et al. | |
| 2010/0046791 A1* | 2/2010 | Glickman | G06K 9/209 382/100 |
| 2010/0097443 A1 | 4/2010 | Lablans | |
| 2010/0171826 A1 | 7/2010 | Hamilton et al. | |
| 2010/0222099 A1 | 9/2010 | Fields | |
| 2010/0321470 A1 | 12/2010 | Oshima | |
| 2011/0007154 A1 | 1/2011 | Vogel et al. | |
| 2011/0011936 A1* | 1/2011 | Morandi | G06K 9/00 235/454 |
| 2011/0079083 A1 | 4/2011 | Yoo et al. | |
| 2011/0173082 A1 | 7/2011 | Breitenbach et al. | |
| 2011/0173100 A1 | 7/2011 | Boncyk et al. | |
| 2012/0027390 A1 | 2/2012 | Ueyama | |
| 2012/0075411 A1 | 3/2012 | Matsumoto et al. | |
| 2012/0243739 A1 | 9/2012 | Fukuchi et al. | |
| 2012/0293607 A1 | 11/2012 | Bhogal et al. | |
| 2012/0300019 A1 | 11/2012 | Yang et al. | |
| 2013/0070090 A1* | 3/2013 | Bufalini | G06F 19/3462 348/143 |
| 2014/0006229 A1* | 1/2014 | Birch | G06Q 10/087 705/28 |
| 2014/0009382 A1 | 1/2014 | Chou et al. | |
| 2014/0052555 A1 | 2/2014 | MacIntosh | |
| 2014/0297487 A1* | 10/2014 | Bashkin | G06Q 10/087 705/28 |
| 2015/0139535 A1 | 5/2015 | Siddiqui | |
| 2015/0141759 A1 | 5/2015 | Charles et al. | |
| 2015/0187101 A1 | 7/2015 | Maayan et al. | |
| 2015/0193909 A1 | 7/2015 | Maayan et al. | |
| 2016/0143459 A1 | 5/2016 | Clein | |

FOREIGN PATENT DOCUMENTS

| | | | | |
|---|---|---|---|---|
| JP | 2003004366 A | * | 1/2003 | |
| JP | 2003004366 A | | 1/2003 | |
| JP | 2007046833 A | | 2/2007 | |
| WO | WO-2012/155121 | | 9/2004 | |
| WO | WO-2008/107150 | | 9/2008 | |
| WO | WO-2009/027835 | | 3/2009 | |
| WO | WO-2014/181323 | | 11/2012 | |
| WO | WO-2013151553 A1 | * | 10/2013 | .......... G06Q 10/087 |
| WO | WO-2015/083170 | | 6/2015 | |
| WO | WO-2015/114621 | | 8/2015 | |
| WO | WO-2015/193877 | | 12/2015 | |

OTHER PUBLICATIONS

International Search Report and Written Opinion from the Israel Patent Office for International Application No. PCT/IL2014/050378, dated Aug. 7, 2014.
International Search Report and Written Opinion from the Israel Patent Office for International Application No. PCT/IL2014/051061, dated Mar. 26, 2015.
International Search Report and Written Opinion from the Israel Patent Office for International Application No. PCT/IL2014/051127, dated May 15, 2015.
International Search Report and Written Opinion from the Israel Patent Office for International Application No. PCT/IL2015/050070, dated Apr. 28, 2015.
International Search Report from the Israel Patent Office for International Application No. PCT/IL2015/050576, dated Oct. 14, 2015.
International Search Report from the Israel Patent Office for International Application No. PCT/IL2014/050377, dated Jul. 25, 2014.

* cited by examiner

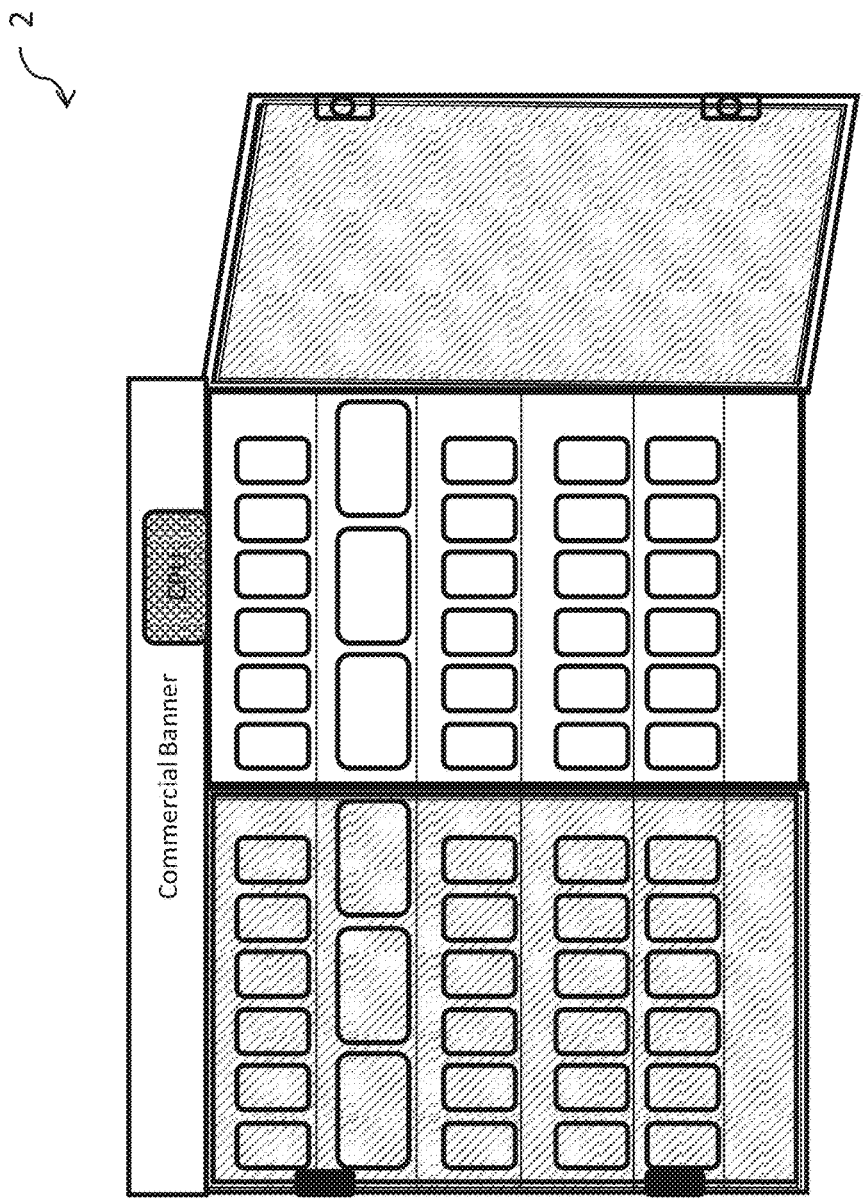

SYSTEM AND METHOD OF MONITORING RETAIL UNITS

TECHNOLOGICAL FIELD

The present disclosure relates generally to the field of retailing. More particularly, the present disclosure relates to a system for and a method of monitoring retail units.

BACKGROUND

Retailers generally offer categories of products associated with their core activities. For example, supermarkets provide food, health and beauty care, and household products, whereas ophthalmic stores provide eyeglasses and accessories. For each category of product, retailers also provide an item assortment to satisfy a wide range of clients by providing items of different brands, designs, sizes, colors, prices, etc.

Suppliers can have considerable influence on retailers, for example by providing financial support or even by providing display stand/cabinet (also referred to as retail unit) for arranging the products in the retailer shop. In return, the suppliers expect their products to be preferentially distributed in the retailer store and/or within the retail unit. In view of large investments by suppliers to support their brand management for having their product prominently displayed in the retailer stores, suppliers would appreciate receiving verification that their product are being displayed accordingly, and as agreed upon with the retailers.

Current techniques of monitoring item display in retailer shops are generally in the form of human inspection visits to retailer stores and there is therefore a need to improve efficiency of these techniques.

GENERAL DESCRIPTION

The present disclosure provides a retail unit comprising a display module capable of accommodating one or more retail items; a door module configured to pivot away (i.e. outwards) from the display module; and an imaging module coupled to the door module and configured to acquire images of the display module. It is understood that the door module may be configured as a swing door and may be coupled to the retail unit and/or to the display module, for example using a hinge mechanism with an axis in a plane of the door module or with an axis out of a plane of the door module. The imaging module may be coupled to the door module so as to pivot with the door module when the door module is operated to pivot away of the display module and be configured to acquire images of at least some of the retail items when the retail items are accommodated in the display module. The term "coupled to the door module" may be appreciated as encompassing the meaning "mounted on the door module" and "arranged on the door module" directly or with the help of a housing and/or supplemental mounting components.

In some embodiments, the retail unit further comprises a housing structure configured for housing the display module, the housing structure defining an access opening configured for enabling inserting and removing retail items from and into the display module.

In some embodiments, the display module comprises a shelving unit.

In some embodiments, the door module comprises a door panel. It is understood that the access opening may be understood as a doorway and that a shape of the door panel may correspond to at least a part the ccess opening. The access opening may be understood as the surface on which at least a part of the door panel lies when the door module is closed. The door panel may be configured to close at least a part of the access opening.

In some embodiments, the door module comprises a hinge mechanism configured for connecting the door panel to the display module, wherein the hinge mechanism is arranged in a peripheral portion of the access opening.

In some embodiments, the imaging module comprises one or more imaging sensors, each imaging sensor being configured so that a line of sight of the imaging sensor is perpendicular to an extension plane of the access opening when the door module is open at a predetermined opening angle. It is understood that when the door panel has a plane shape (for example a rectangular shape), the access opening also has a plane shape (i.e. extends in a plane) so that a direction perpendicular to the access opening plane can be clearly defined.

In some embodiments, the imaging module is further configured so that a field of view of the imaging module covers the access opening when the door module is open at the predetermined opening angle.

In some embodiments, the one or more imaging sensors are arranged in a peripheral portion of the door panel.

In some embodiments, the one or more imaging sensors are arranged on a side opposite to a side of a pivot axis of the door panel.

In some embodiments, the retail unit further comprises one or more sensor housings, each sensor housing being configured for housing an imaging sensor and for enabling adjustment of the line of sight of the imaging sensor.

In some embodiments, the one or more sensor housings are integral to the door module.

In some embodiments, the imaging module is configured to be activated upon detection of door module motion.

In another broad aspect, the present disclosure provides a retail system comprising a plurality of retail units as previously described.

In some embodiments, the retail unit or the retail system, further comprises a processor module connected to the imaging sensor, the processor module being configured for receiving the images acquired by the imaging module and for communicating one or more of said acquired images to a remote control center.

In some embodiments, the processor module is further configured for providing electric power to the imaging module.

In some embodiments, the imaging module comprises a plurality of imaging sensors and the processor module is further configured for mixing images acquired simultaneously by the plurality of imaging sensors.

In another aspect, the present disclosure provides a method of monitoring a retail unit comprising the steps of acquiring images of one or more retail items accommodated in a display module of the retail unit using an imaging module coupled to (or arranged on) a door module of the retail unit, the door module being configured for pivoting away from the display module upon operation; transmitting the acquired images of the one or more retail items to a remote control center.

In some embodiments, the method further comprises discarding one or more images from the acquired images thereby obtaining a subset of eligible images and wherein transmitting the images consists of transmitting the subset of eligible images to the remote control center.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4 illustrates a retail system according to some embodiments of the present disclosure.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known features, structures, characteristics, stages, methods, procedures, modules, components and systems, have not been described in detail so as not to obscure the present invention.

Unless specifically stated otherwise, as apparent from the following discussions, it is appreciated that throughout the specification discussions utilizing terms such as "processing", "calculating", "computing", "determining", "generating", "stitching", "configuring", "selecting", "defining", or the like, include action and/or processes of a computer that manipulate and/or transform data into other data, said data represented as physical quantities, e.g. such as electronic quantities, and/or said data representing the physical objects. The terms "computer" and "processor" should be expansively construed to cover any kind of electronic device with data processing capabilities.

The operations in accordance with the teachings herein may be performed by a computer specially constructed for the desired purposes or by a general purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Any trademark occurring in the text or drawings is the property of its owner and occurs herein merely to explain or illustrate one example of how the presently discussed subject matter may be implemented.

Figure 1:
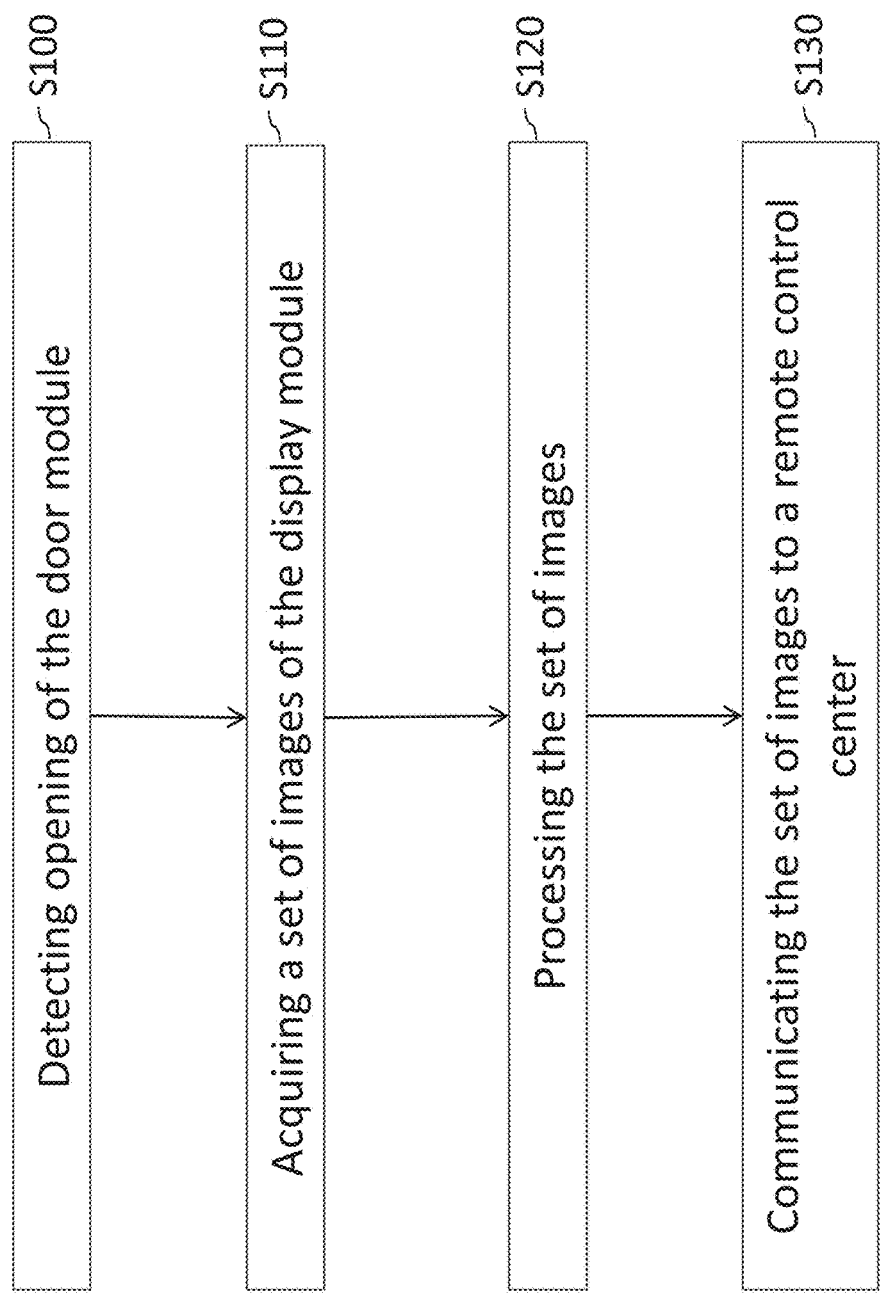
FIG. 1 is a flow chart illustrating steps of a method of monitoring a retail unit according to some embodiments of the present disclosure.

FIG. 1 illustrates steps of a method of monitoring (or inspecting) a retail unit according to embodiments of the present disclosure. Generally, the retail unit may comprise a display module being capable of accommodating retail items. The display module may be housed in a housing structure. The housing structure may define an inner volume for housing the display module and an access opening enabling inserting/removing retail items to/from the display module. For example, the retail unit may be a refrigerator or a cabinet provided with a shelving unit. The retail unit may further comprise a door module configured for pivoting away from the display module. The door module may be operated (positioned) in an open state and in a closed state. In the closed state, the door module may face an access opening of the display module and in the open state, at least a part of the door module may be distant from the access opening. The access opening may generally be understood as a doorway or an interface surface between the door module and the display module. For example, the door module may actually comprise a door panel hinged to a peripheral portion of the display module. It is noted that the door module may not comprise a door panel i.e. the door module may consist of a frame. Furthermore, an imaging module may be coupled to the door module and configured to image the display module thereby allowing imaging of the retail items intended to be disposed in the display module. For example, the imaging module may comprise one or more cameras mounted on the inner side of the door module (i.e. the side of the door module facing the access opening when the door module is in the closed state). Generally, the access opening of the display module may be understood as an entrance surface to the display module enabling to insert or remove retail items in the display module. In some embodiments, the access opening extends in a plane (i.e. has a plane shape like a disk or a plate) and the imaging module comprises one or more imaging sensors and the line of sight of the imaging sensors is configured so as to be perpendicular to the access opening plane when the door module is open at a predetermined opening angle.

In a first step S100, an open state of the door module may be detected. The opening of the door module may be detected using a switch or by detecting a change in a stream of images acquired by the imaging module, as will be explained later with reference to FIGS. 2A-2B. In some embodiments, an opening detection module may enable to detect an opening level of the door module. For example, the opening detection module may enable to detect if the door module has been pivoted away of the display module of an angle above a predetermined opening angle threshold and/or for a duration above a predetermined opening duration threshold. In a second step S110, a set of images of the display module may be acquired by the imaging module. In certain embodiments, the imaging module may image continuously and step S110 may comprise increasing the image acquisition frequency. Alternatively, in some embodiments, the image acquisition may be triggered by the opening detection. The image acquisition may be stopped by detection of the door module closing or may be automatically triggered after a predetermined duration from the door opening detection time. The acquired images may be forwarded to a processor module for further image processing. In a third optional step S120, the set of acquired images may be processed by the processor module. When several imaging sensors are mounted on a door module, the processing may enable to stitch (mix) images acquired simultaneously by the imaging sensors of the imaging module so as to increase a Field Of View (FOV) thereby leading to obtaining a set of stitched images. Finally, in a fourth step S130, the set of mixed images may be communicated to a remote control center. The remote control center may perform further analysis on the communicated images so as to determine how the retail items are assorted in the display module for assessing whether or not the retail unit complies with predefined assortment rules.

Figures 2A, 2B:
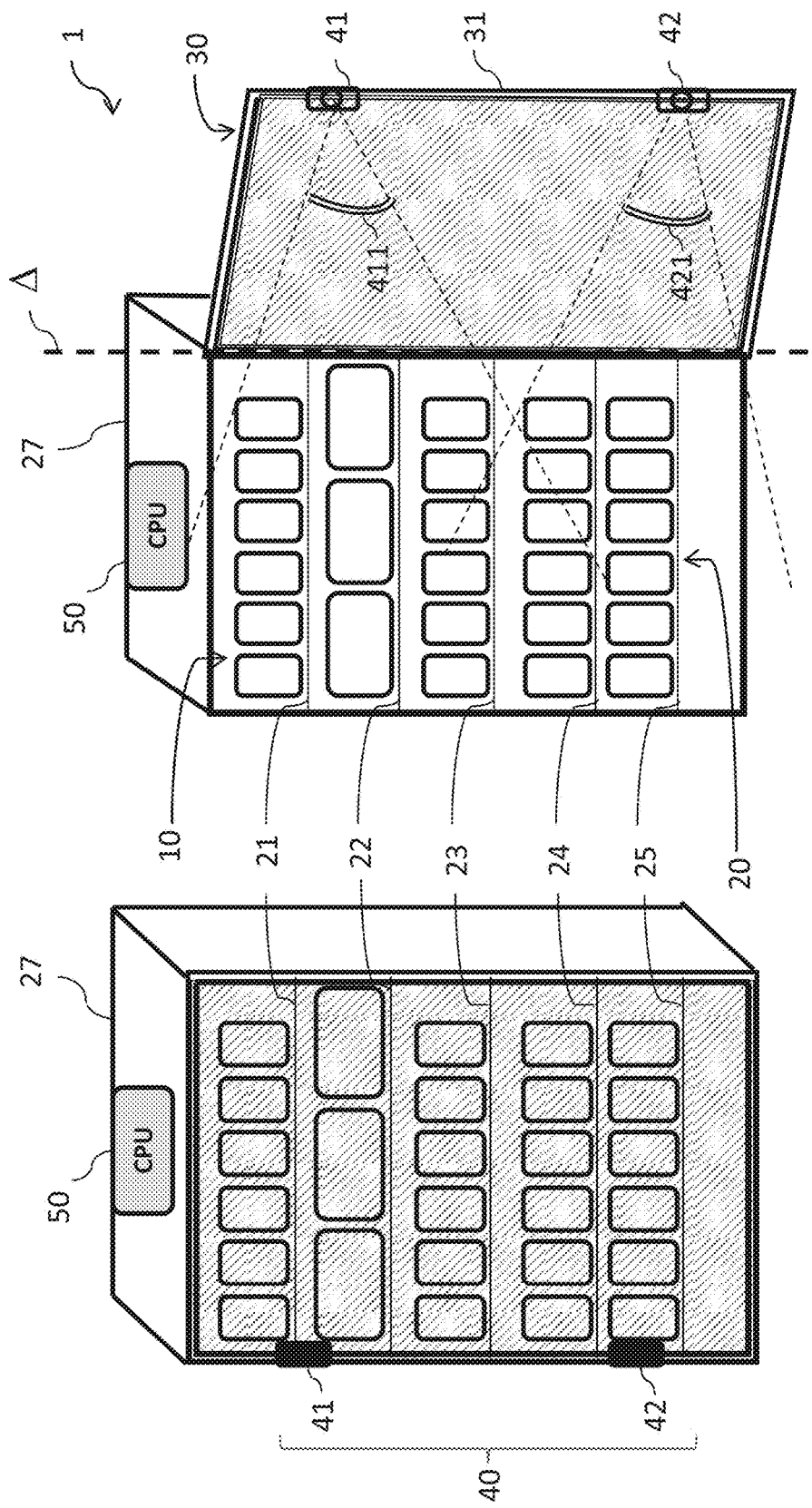
FIG. 2A-2B illustrate schematically a retail unit according to some embodiments of the present disclosure.

FIGS. 2A and 2B illustrate a retail unit 1 according to some embodiments of the present disclosure. The retail unit 1 comprises a display module 20, a door module 30, an imaging module 40 and a processor module 50. FIG. 2A shows a retail unit with the door module 30 open while FIG. 2B shows the retail unit with the door module 30 closed. It is noted that, even though the illustrated embodiment refers to a retail unit 1 in the form of a refrigerator, the features described herein below can be extended to different types of retail units such as all kinds of cabinets.

The display module 20 is capable of accommodating one or more retail items 10. In some embodiments, the display module 20 may comprise one or more shelves 21-25. The retail unit 1 may further comprise a housing structure 27 (also referred to generally as housing) partially enclosing the display module 20. The housing 27 may comprise an access opening enabling a user to access the one or more shelves 21-25 so as to allow seizing of a retail item from the one or more shelves 21-25. In other words, the housing 27 and the display module 20 may define a structure in which the retail items are intended to be accommodated and the access opening may be defined as an aperture (or an entrance surface) of the housing enabling to access the retail items. The one or more shelves 21-25 may be disposed in parallel within the housing 27 and may be capable of storing and/or displaying the one or more retail items 10. The one or more retail items may for example comprise drinks, food products, eyewear, medicine, etc.

The door module 30 is configured to close at least a part of the access opening. The door module 30 may comprise a door panel 31. In some embodiments, the door panel 31 may be transparent so as to allow people standing in front of the retail unit 1 to see the retail items 10 intended to be accommodated in the retail unit 1. The door module 30 may comprise a handle (not shown) and may be opened and closed upon operation of the handle by a user. The door panel 31 may be configured to pivot away from the access opening of the display module 20. The door panel 31 may further be configured to close the access opening when the door module 30 is operated. In some embodiments, a hinge mechanism (not shown) may be positioned on a peripheral portion of the access opening so as to define a pivot axis Δ of the door panel 31.

The imaging module 40 may be coupled to the door module 30 and configured to acquire images of the display module 20. More precisely, the imaging module 40 may be configured for imaging the one or more retail items 10 when the one or more retail items 10 are accommodated in the display module 20. The imaging module 40 may be arranged on the side of the door panel 31 facing the display module 20. Arranging the imaging module 40 as described enables monitoring enclosed display modules, particularly for brand management purposes. In fact, monitoring enclosed cabinets is generally difficult because either the door is closed and it is not possible to image through the door (for example because the door is opaque or because frost deposited on the door surface causes image distortion), or the door is open by a user but the user stands in front of the display module and obstructs (obscures) the imaging. Therefore, arranging the imaging module as previously described notably enables to reduce image obstruction by users removing/inserting items from/into the display module 20.

Figure 3:
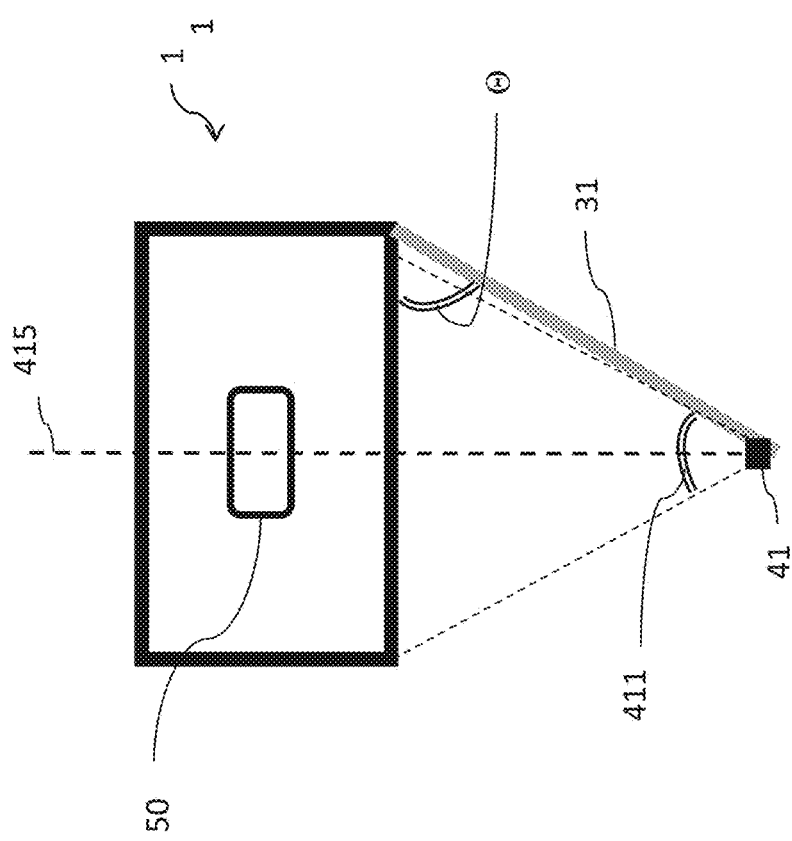
FIG. 3 illustrates schematically an upper view of a retail unit according to some embodiments of the present disclosure.

The imaging module 40 may comprise one or more imaging sensors 41, 42. The FOV of the imaging module 40 may enable to image the access opening. Preferably, when several imaging sensors are provided, the FOV of the imaging sensors may overlap so as to enable stitching of images acquired simultaneously. In some embodiments, the imaging sensors 41, 42 may for example be digital cameras with FOV of 75*60 degrees. The FOV in one direction may correspond to a width of the one or more shelves. With reference to FIG. 3 and generally in some embodiments in which the door module 30 comprises a door panel 31 pivoting away from the access opening of the display module 20, the one or more imaging sensors 41, 42 may each be mounted on the door panel 31 so that a line of sight 415 of said imaging sensors be perpendicular to the access opening when the door panel 31 is open at a predetermined opening angle Θ. This enables to configure the imaging sensors 41, 42 so as to "face" the access opening when the imaging sensors 41, 42 are at a predetermined distance from the access opening and thereby increases the filed of view. In some embodiments, the opening angle Θ may be set between 45° to 75°, preferably around 60°. The Applicant has found that this angle range corresponds to the position people usually assume when holding the door open for removing or inserting items in a cabinet. Therefore, by configuring the imaging sensors so as to face the access opening at a predetermined angle within the aforementioned angle range, distortions due to door motion are advantageously reduced and imaging is improved. Furthermore, the one or more imaging sensors 41, 42 may be configured so that the field of views 411, 412 of the one or more imaging sensors 41, 42 enable imaging of the whole access opening when the door panel 31 is open at the predetermined opening angle Θ. The one or more imaging sensors 41, 42 may be arranged in a peripheral portion of the door panel 31. Advantageously, at least some of the imaging sensors may be arranged on a side of the door panel 31 opposite to a side of the pivot axis Δ. The Applicant has found that, in some embodiments in which two imaging sensors 41, 42 are placed on the side of the door panel 31 opposite to the pivot axis Δ, it is advantageous to position the imaging sensors respectively in the first third and in the last third of the door panel length, wherein the length of the door panel 31 is defined along a direction parallel to the pivot axis Δ direction. This notably enables to further reduce imaging obstruction. The Applicant has also found that in some embodiments in which at least one imaging sensor is positioned on the side of the door panel 31 opposite to the pivot axis Δ, it is advantageous to position the imaging sensor either in the first or in the last third of the door panel length. Therefore, advantageously, at least one imaging sensor may be positioned either in the first or in the last third of the door panel length.

Furthermore, the one or more imaging sensors 41, 42 may be mounted in one or more corresponding sensor housings. The sensor housings may be mounted on the inside door panel 31. The sensor housings may allow for adjustment and calibration of the angle of the imaging sensor in two perpendicular planes. For example, the sensor housing may allow for an angle adjustment of about 60° in either of the two perpendicular planes.

The imaging sensors 41, 42 may be configured to be activated only upon detection of the opening of the door module 20. This enables to reduce the amount of images to acquire and/or to communicate and/or to store. Alternatively, the imaging sensors 41, 42 may be configured for continuously acquiring images at a predetermined frequency and be further configured to increase image frequency acquisition upon detection of the opening of the door module. An increased image acquisition frequency may be of around 15-17 images per second as a continuous image acquisition frequency may be of around 1-2 images per second. The series of images acquired between an opening and a subsequent closing of the door module may be recorded as an event and the images within each event may be numbered in sequence. All imaging sensors on the door module may take corresponding images that are identified in sequence of each event i.e. images acquired simultaneously by different imaging sensors may be identified according to their sequence number. Further, the number of images acquired in an event is correlated to the average velocity of manual door opening which is estimated at 0.5 m/sec. In some embodiments, the retail unit further comprises a switch that connects when the door module is open and disconnects when the door module is closed so as to detect door module opening. In some embodiments in which the imaging sensors are configured for continuous acquisition, motion detection may be performed by successive images analysis.

The processor module 50 is connected to the one or more imaging sensors 41, 42 and is configured to receive the images acquired by said imaging sensors 41, 42. In some embodiments, the one or more imaging sensors 41, 42 are connected to the processor module 50 via a mini Universal Serial Bus (USB) connector and one or more USB cables that may additionally power the imaging sensors 41, 42. The one or more USB cables may be tucked into a gasket around the door panel in order to conceal them and to avoid interfering with the movement of the door panel. The processor module 50 may comprise a mini Personal Computer (PC) with one or more USB inputs on the motherboard (for example 6 to 8 inputs). The processor module 50 may use Solid State Drive (SSD) memory and may have a specially Linux™ based operating system. The processor module 50 may be powered by an external source and may supply power to the imaging sensors 41, 42 via the USB cables. The processor module 50 may be housed in a compact casing that can be easily mounted on the top or side of a refrigerator. Advantageously, the processor module may be concealed behind a commercial banner. Further, the processor module 50 may be configured for performing image processing. For example, the processor module 50 may be configured to detect a change between two successive images received from the same imaging sensor so as to detect opening and closing of the door module. Further, in some embodiments in which several imaging sensors are used to image the access opening, the processor module 50 may be configured for stitching images received by different imaging sensors at the same instant so as to increase the FOV and allow reconstructing complete images of the access opening. Furthermore, the processor module 50 may be configured for communicating data to a remote control center. The processor module 50 may connect to the Internet via a wire or wireless connection such as 3G/4G/Wifi/Wimax, etc. In some embodiments in which a wireless connection is used, a wireless module may be connected directly to the motherboard or via a USB port. In some embodiments in which a 3G connection is used, the 3G may use a local 3G SIM card in order to connect to the network and allow the processor module 50 to upload either the acquired images or the mixed images to the remote control center. Once the images are uploaded to the remote control center, the images may be processed and items accommodated on the display module 20 can be analyzed to check if item assortment rules are respected. The Internet connection may also allow for remote software update of the processor module 50. A power adapter for 110/220V may power the processor module 50 and the imaging sensors 41, 42.

FIG. 4 illustrates a retail system 2 according to some embodiments of the present disclosure. The retail system 2 comprises two retail units as previously described. It is understood that generally a retail system may comprise more than two retail units. Further, it is also noted that a single processor module may be used in a retail system comprising two or more retail units. In some embodiments, each door module is mounted with an imaging module which are all connected to the same processor module. In some embodiments in which opening detection is implemented using image stream analysis, a round robin algorithm for sampling images from all the cameras is implemented for motion detection. This enables to handle the feed from the multiple imaging sensors. Once motion is detected the processor module may focus on the opened door until motion stops. Thereafter, the round robin algorithm may be resumed. The purpose of this process is to focus both processing power and camera capturing capabilities on the most relevant action, which in turns enable us to maximize the system capabilities.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

The invention claimed is:

1. An imaging system for retail brand management, the system comprising:
   a housing configured to accommodate a plurality of retail items;
   an access opening associated with the housing;
   a door configured to pivot toward and away from the access opening about a pivot axis, the door including a peripheral frame;
   at least one image sensor configured to acquire images of the plurality of retail items;
   at least one sensor housing mountable on an inside panel of the door on a side of the peripheral frame of the door opposite the pivot axis, wherein the at least one sensor housing is configured to enable adjustment of a field of view of the at least one image sensor in two perpendicular planes and positioning the at least one image sensor such that when the door is opened to a predetermined angle, a field of view of the at least one image sensor substantially covers the access opening; and at least one processor configured to:
- detect a change between two successive images captured by the at least one image sensor to thereby determine opening of the door;
- increase an image acquisition frequency of the at least one image sensor upon detection of the opening of the door, wherein the image acquisition frequency is increased from a continuous image acquisition frequency to an increased image acquisition frequency;
- analyze images acquired by the at least one image sensor to determine that the door has been opened for a period of time greater than a predetermined opening duration threshold; and
- transmit data associated with images acquired during the period of time to a remote control center for determining how the retail items are assorted in the housing and for assessing whether the displayed retail items comply with predefined assortment rules.

2. The imaging system of claim 1, wherein the housing is a retail display module and the door includes a transparent panel.

3. The imaging system of claim 1, wherein the at least one sensor housing is configured to position the at least one image sensor such that a line of sight of the at least one image sensor is configured to be substantially perpendicular to a plane of the access opening when the door is opened at about 60 degrees.

4. The imaging system of claim 1, wherein the predetermined opening angle is between 45 to 75 degrees.

5. The imaging system of claim 1, wherein the predetermined opening angle is about 60 degrees.

6. The imaging system of claim 1, wherein the transmitted data is associated with images acquired between an opening and a subsequent closing of the door.

7. The imaging system of claim 1, wherein the at least one processor is configured to transmit the data associated with the images to the remote control center for image processing at the remote control center.

8. The imaging system of claim 1, wherein the at least one image sensor includes a first image sensor and a second image sensor both arranged on the side of the peripheral frame of the door opposite the pivot axis.

9. The imaging system of claim 8, wherein the first image sensor is positioned in the first third of the door and a second image sensor is positioned in the last third of the door.

10. The imaging system of claim 8, wherein the at least one processor is further configured to stitch images acquired simultaneously by the first and second image sensors.

11. The imaging system of claim 1, wherein the at least one sensor housing is configured to enable an adjustment of about 60 degrees in either of the two perpendicular planes.

12. A method for retail brand management using an imaging system including a housing configured to accommodate a plurality of retail items, an access opening associated with the housing, and a door having a peripheral frame and configured to pivot toward and away from the access opening about a pivot axis, the method comprising:
- positioning at least one image sensor using at least one sensor housing such that when the door is opened to a predetermined angle, a field of view of the at least one image sensor substantially covers the access opening, wherein the at least one sensor housing is mountable on an inside panel of the door on a side of the peripheral frame of the door opposite the pivot axis, the at least one sensor housing is configured to enable adjustment of a field of view of the at least one image sensor in two perpendicular planes;
- detecting a change between two successive images captured by the at least one image sensor to thereby determine opening of the door;
- increasing an image acquisition frequency of the at least one image sensor upon detection of the opening of the door, wherein the image acquisition frequency is increased from a continuous image acquisition frequency to an increased image acquisition frequency;
- analyzing images acquired by the at least one image sensor to determine that the door has been opened for a period of time greater than a predetermined opening duration threshold; and
- transmitting data associated with images acquired to a remote control center for determining how the retail items are assorted in the housing and for assessing whether the displayed retail items comply with predefined assortment rules.

13. The method of claim 12, further comprising:
- discarding at least some images from the acquired images for obtaining a subset of eligible images, and wherein transmitting the data consists of transmitting data associated with the subset of eligible images to the remote control center.

* * * * *